(12) United States Patent
Faulkner et al.

(10) Patent No.: US 7,729,259 B1
(45) Date of Patent: Jun. 1, 2010

(54) REDUCING LATENCY JITTER IN A STORE-AND-FORWARD BUFFER FOR MIXED-PRIORITY TRAFFIC

(75) Inventors: Steven Faulkner, Cary, NC (US); Sonny Tran, Fremont, CA (US); Yie-Fong Dan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1153 days.

(21) Appl. No.: 10/760,935

(22) Filed: Jan. 20, 2004

(51) Int. Cl.
*H04L 12/26* (2006.01)
(52) U.S. Cl. .................... 370/236; 370/229; 370/230.1; 370/231; 370/235; 370/428
(58) Field of Classification Search .................. 370/229, 370/230.1, 231, 235, 236, 428
See application file for complete search history.

(56) References Cited

U.S. PATENT DOCUMENTS

| | | | | |
|---|---|---|---|---|
| 5,493,566 A * | 2/1996 | Ljungberg et al. | .......... | 370/231 |
| 6,259,698 B1 * | 7/2001 | Shin et al. | ................. | 370/395.7 |
| 6,324,165 B1 * | 11/2001 | Fan et al. | .................... | 370/232 |
| 6,330,451 B1 | 12/2001 | Sen et al. | ..................... | 455/452 |
| 6,388,993 B1 * | 5/2002 | Shin et al. | .................... | 370/233 |
| 6,452,915 B1 | 9/2002 | Jorgensen | ................... | 370/338 |
| 6,459,682 B1 | 10/2002 | Ellesson et al. | ............. | 370/235 |
| 6,640,248 B1 | 10/2003 | Jorgensen | ................... | 709/226 |
| 6,785,236 B1 * | 8/2004 | Lo et al. | ...................... | 370/235 |
| 6,934,296 B2 * | 8/2005 | Shimojo | ....................... | 370/428 |

* cited by examiner

*Primary Examiner*—William Trost, IV
*Assistant Examiner*—Toan D Nguyen

(57) ABSTRACT

Methods and apparatus for reducing the average delay associated with sending a packet from one environment to another via a store and forward buffer are disclosed. According to one aspect of the present invention, a method for processing transmission units received over a first network connection includes receiving a first transmission unit on the first network connection, storing the first transmission unit in a buffer, and determining when contents of the buffer meet a plurality of criteria. The method also includes sending a backpressure over the first network connection when it is determined that the contents of the buffer meet the plurality of criteria. In one embodiment, determining when the contents of the buffer meet a plurality of criteria includes determining when the contents of the buffer are of an amount that exceeds a threshold and determining when the contents of the buffer include at least one full packet.

28 Claims, 11 Drawing Sheets

REDUCING LATENCY JITTER IN A STORE-AND-FORWARD BUFFER FOR MIXED-PRIORITY TRAFFIC

BACKGROUND OF THE INVENTION

1. Field of Invention

The present invention relates generally to network systems. More particularly, the present invention relates to effectively reducing the average delay introduced by a store and forward buffer used for mixed-priority traffic.

2. Description of the Related Art

The demand for data communication services is growing at an explosive rate. Much of the increased demand is due to the fact that more residential and business computer users are becoming connected to the Internet. Within an optical network, different networks, or environments, may be in communication with one another. For example, an overall network may include multiple environments which have different timing requirements. In order for packets to be sent between two environments with different timing requirements, buffers may be used between the environments to temporarily hold packets to effectively ensure that entire packets are moved into a receiving environment.

FIG. 1a is a diagrammatic representation of a network which includes a store and forward buffer that temporarily holds packets. A first environment 104, which is arranged to send packets from a network processor or a traffic management chip, is connected by a dedicated bus 106, e.g., a SPI3 bus or a SPI4 bus, to a store and forward buffer 116 that is typically associated with a framer or controller 112. As will be understood by those skilled in the art, a traffic management chip is a chip which provides buffering and queuing for packets. The size of buffer 116 is typically such that buffer 116 is at least one or two times the size of the maximum transmission unit that will be transmitted by first environment 104 or a second environment 108. Packets 120 which are sent from first environment 104 to buffer 116 are generally stored on buffer 116 until such time as buffer 116 may forward packets 120 on a bus 110 to second environment 108 on a first in, first out basis. Second environment 108 has an associated physical layer interface, as for example a synchronous optical network (SONET) interface, an Ethernet interface, or a T1/E1 interface. Second environment 108 typically has different timing requirements than first environment 104, so buffer 116 enables packet underrun to effectively be prevented by storing packets 120 until second environment 108 is ready to receive packets 120.

In many instances, packets 120 may be of mixed priorities. By way of example, first environment 104 may attempt to forward both low priority traffic and high priority traffic such as real-time traffic. When first environment 104 is providing packets 120 to buffer 116 faster than second environment 108 may receive them, i.e., when the exit rate from buffer 116 is insufficient to effectively support the entry rate into buffer 116, or when buffer 116 is nearly full, framer or controller 112 may send a per port backpressure 124 to first environment 104. In general, backpressure may either be sent over bus 106 or over separate lines (not shown). Backpressure 124 is effectively a jamming or a blocking technique which serves to enable frame losses to be reduced when one or more ports associated with framer or controller 112 are considered to be saturated. The use of backpressure 124 may prevent a deadlock situation between first environment 104 and framer or controller 112. As will be appreciated by those skilled in the art, when backpressure 124 is sent to first environment 104, first environment 104 may delay sending further packets 120 to buffer 116 until such time as it is appropriate to continue sending packets 120. A backpressure threshold which, when reached, causes a backpressure to be sent is restricted to being larger than a maximum packet size in order to avoid a deadlock condition. Restricting the backpressure threshold to be larger than the maximum packet size is needed to prevent a deadlock condition from being reached because the start of a packet transfer from buffer 116 to second environment 108 would not occur until an entire packet was received by buffer 116, but the receipt of the packet by buffer 116 would be stalled prior to completion until after packet transfer out of buffer 116 lowers the fill level of the buffer 116.

The relative packet transfer speed of first environment 104 will typically vary from the relative packet transfer speed of second environment 108. Either first environment 104 or second environment 108 may have a faster relative packet transfer speed. As such, buffer 116 must be designed to accommodate either condition, i.e., buffer 116 must be arranged to support first environment 104 having a higher relative packet transfer speed and second environment 108 having a higher relative packet transfer speed. When first environment 104 has a slower packet transfer speed than second environment 108, to prevent underrun of buffer 116, all of a packet must be buffered in buffer 116 before the packet begins to be sent to second environment 108. When first environment 104 has a faster packet transfer speed than second environment 108, to prevent overrun, backpressure is asserted from buffer 116 before buffer 116 is completely full, since buffer 116 must account for additional packet data sent before first environment 104 may fully respond to the backpressure request When buffer 116 is full, e.g., full of low priority packets, when a high priority packet is to be sent by first environment 104 to second environment 108, there will generally be a delay before the high priority packet is received by second environment 108 since substantially all packets 120 already waiting in buffer 116 will need to be sent to second environment 108 before the high priority packet may reach second environment 108. The delay generally increases as the size of buffer 116 increases, and also as the speed associated with second environment 108 or, more specifically, a physical layer interface of second environment 108 decreases.

With reference to FIGS. 1b and 1c, the forwarding of a high priority packet through a substantially full store and forward buffer such as buffer 116 of FIG. 1a will be described. Buffer 116 contains low priority packets 120b-e which are to be forwarded out of buffer 116, e.g., after low priority packet 120a is forwarded out of buffer 116 and received by a receiving environment such as second environment 108 of FIG. 1a. A sorter 140 within first environment 104 sorts packets, as for example packets 120h-1, and substantially identifies high priority packets and low priority packets. As shown, since buffer 116 is relatively full, a high priority packet 120g is effectively queued to be sent to buffer 116 as soon as space is available in buffer 116, while a low priority packet 120f is effectively queued to be sent to buffer 116 after high priority packet 120g is sent.

Typically, high priority packets such as high priority packet 120g are expected to be transferred through buffer 116 with a low average latency, and low latency jitter. High priority packet 120g is delayed from reaching a receiving environment such as environment 108 of FIG. 1a because high priority packet 120g may not reach the receiving environment until substantially all packets which are already in buffer 116 reach the receiving environment. While high priority packet 120g may be forwarded to buffer 116 such that high priority packet 120g is queued in buffer 116 after low priority packet 120e, as shown in FIG. 1c, the delay between when high priority packet 120g is provided to buffer 116 and when high priority packet 120g is received by the receiving environment is essentially equal to the amount of time it takes to "drain" low priority packets 120b-e from buffer 116. For example, if buffer 116 is arranged to store approximately sixteen thousand bytes and is drained by a T1 line, the draining process may take approximately 85 milliseconds (ms), which may be an unacceptable delay for high priority packet 120g.

As interface speeds increase, maximum packet size requirements and real-time traffic requirements also increase, thereby rendering the use of a single buffer to be ineffective. In addition, increased demands for systems which may accommodate a wide range of interface speeds further increase the difficulty of using a single buffer. In order to reduce the potential delays associated with sending high priority packets through a buffer which may be used for mixed-priority traffic, some framers or controllers may utilize two store and forward buffers, namely a store and forward buffer which is arranged to buffer low priority traffic and a store and forward buffer which is arranged to buffer high priority traffic FIG. 2a is a diagrammatic representation of a network that includes two store and forward buffers that are arranged to store packets. A first environment 204 is arranged to forward mixed priority traffic in the form of packets 220 to a second environment 208 through a framer or controller 212 which includes a first store and forward buffer 216a and a second store and forward buffer 216b. A dedicated bus 206 may be used to carry packets between first environment 204 and framer or controller 212, while a bus 210 may be used to carry packets between framer or controller 212 and second environment 208. Buffer 216a is arranged to effectively hold low priority packets received from first environment 204 until second environment 208 may receive the low priority packets, while buffer 216b is arranged to effectively hold high priority packets received from first environment 204 until second environment 208 may receive the high priority packet.

Framer or controller 212 may send a backpressure 224a which indicates that buffer 216a is full, and a backpressure 224b which indicates that buffer 216b is full. Hence, when buffer 216a is full, first environment 204 may continue to send high priority packets to buffer 216b, and when buffer 216b is full, first environment 204 may continue to send low priority packets to buffer 216a.

The use of separate buffers 216a, 216b to hold low priority packets and high priority packets, respectively, may reduce delays associated with sending high priority packets to environment 208, as the need to effectively wait for low priority packets in a buffer, e.g., buffer 216a, to be drained before sending high priority packets may be substantially eliminated. Framer or controller 212 may be arranged to drain buffer 216a substantially only when buffer 216b has already been drained or is otherwise empty. As shown in FIG. 2b, a packet sorter or environment 204 may sort packets 220 and provide the sorted packets to buffers 216. When buffer 216b is empty, and buffer 216a contains low priority packets 220b-e, buffer 216a will forward low priority packets 220b-e to a receiving environment, as for example second environment 208 of FIG. 2a, after low priority packet 220a is received by the receiving environment.

When buffer 216b has any contents, as for example high priority packets 220h-k as shown in FIG. 2c, buffer 216b generally must effectively be drained before low priority packets 220b-e may be sent to a receiving environment. Further, substantially all high priority packets identified in first environment 204, e.g., high priority packet 2201, must also be sent to a receiving environment through buffer 216b before low priority packets 220b-e may be sent to the receiving environment. By way of example, high priority packets 220h-k, as well as high priority packet 2201 and other high priority packets currently identified in first environment 204, are sent to a receiving environment after high priority packet 220g before the first low priority packet in buffer 216a, namely low priority packet 220b, may be sent to the receiving environment. It should be understood that in some situations, the sending of packets 220 to a receiving environment may further be delayed when a backpressure is sent to first environment 204 to indicate that the transmission of packets between first environment 204 to buffers 216a, 216b should be slowed or delayed.

In general, the use of a separate high priority store and forward buffer in addition to a separate low priority store and forward buffer is effective for reducing the amount by which a high priority packet may be delayed or the latency associated with reaching a destination such as a receiving environment. The maximum latency and latency jitter associated with a high priority packet in a system which includes separate high priority and low priority store and forward buffers is not more than the time required to transfer a low priority packet that is in the process of being sent, i.e., no more than the amount of time required to transfer a large low priority packet to a receiving environment. In a best case, the latency would be approximately zero, so the maximum latency jitter is also relatively low. However, the use of two buffers to store and to forward mixed-priority traffic is both relatively expensive and relatively complex to implement, which may make the use of two buffers to reduce maximum latency and latency jitter inefficient and impractical.

Therefore, what is desired is a method and an apparatus for enabling potential delays associated with sending high priority packets in mixed-priority traffic to be efficiently reduced. More specifically, what is needed is a system which enables the number of packets stored in a store-and-forward buffer to be controlled such that the maximum amount by which a high priority packet may be delayed from reaching a destination may effectively be reduced.

SUMMARY OF THE INVENTION

The present invention relates to a system for reducing the average delay associated with sending a packet from one environment to another via a store and forward buffer. According to one aspect of the present invention, a method for processing transmission units received over a first network connection includes receiving a first transmission unit on the first network connection, storing the first transmission unit in a buffer, and determining when contents of the buffer meet a plurality of criteria. The method also includes sending a backpressure over the first network connection when it is determined that the contents of the buffer meet the plurality of criteria. In one embodiment, determining when the contents of the buffer meet a plurality of criteria includes determining when the contents of the buffer are of an amount that exceeds a threshold and determining when the contents of the buffer include at least one full packet.

In another embodiment, when it is determined that the contents of the buffer do not meet the plurality of criteria, the method includes receiving a second transmission unit on the first network connection and storing the second transmission unit in the buffer. In such an embodiment, the first and second transmission units may be packets or the first and second transmission units may be bits in general.

The average delays associated with sending packets such as high priority packets may be reduced substantially without incurring significant overhead costs by controlling the number of packets which may be stored in a store and forward buffer at any given time. By limiting a store and forward buffer to store a single relatively large packet, or a plurality of relatively small packets when both a packet forwarding environment and a packet receiving environment are relatively fast, the average delay associated with forwarding a packet out of the packet forwarding environment may be approximately equal to the time it takes to drain the single relatively large packet, or the plurality of relatively small packets, from the store and forward buffer. The number of packets stored in a store and forward buffer may effectively be controlled when a backpressure is provided to a packet-forwarding environment substantially only when there is at least one full or complete packet in the store and forward buffer, and the contents of the buffer exceed a particular threshold amount.

According to another aspect of the present invention, a method for communicating with a store and forward buffer through a first network connection includes determining when a backpressure is received through the first network connection. The backpressure indicates that the store and forward buffer includes at least one full packet and also includes contents which exceed a threshold amount. The method also includes determining when there is available space in the store and forward buffer for the first packet if it is determined that the backpressure is received through the first network connection, and sending a first packet over the first network connection when it is determined that there is available space in the store and forward buffer for the first packet.

In one embodiment, the method includes sorting packets. Sorting packets includes identifying the first packet to be sent over the first network connection to the store and forward buffer. In such an embodiment, sorting packets may also include sorting packets to identify relatively low priority packets and relatively high priority packets.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a block diagram representation of the forwarding of packets through a substantially full store and forward buffer, e.g., such as buffer 116 of FIG. 1a.

FIG. 1c is a block diagram representation of the forwarding of a high priority packet through a substantially full store and forward buffer, e.g., buffer 116 of FIG. 1a.

FIG. 2b is a block diagram representation of the forwarding of packets through a buffer arrangement which includes two store and forward buffers e.g., buffers 216a and 216b of FIG. 2a.

FIG. 2c is a block diagram representation of the forwarding of a high priority packet through a buffer arrangement which includes two store and forward buffers e.g., buffers 216a and 216b of FIG. 2a.

DETAILED DESCRIPTION OF THE EMBODIMENTS

Figure 1A:
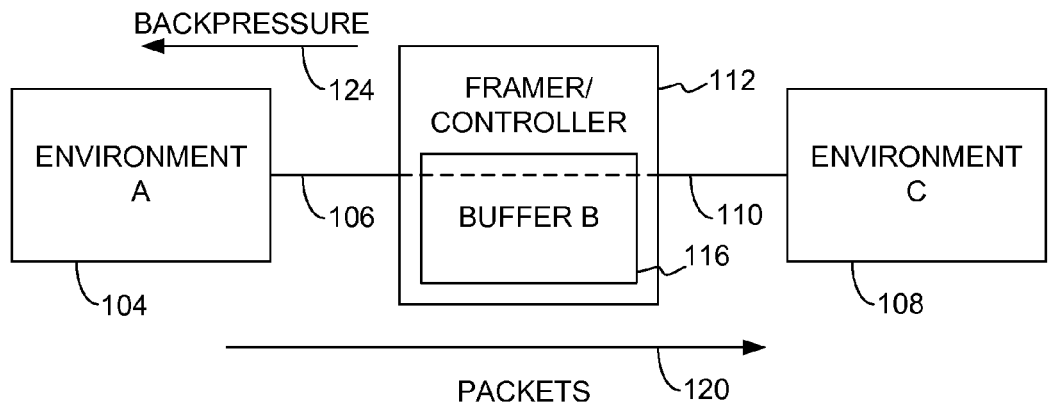
FIG. 1a is a diagrammatic representation of a network which includes a store and forward buffer that temporarily holds packets.
Figure 1B:
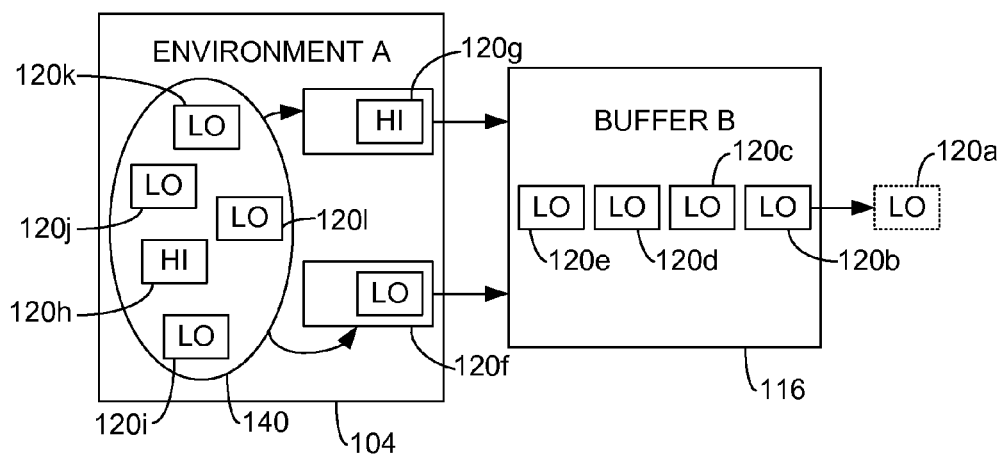
Figure 1C:
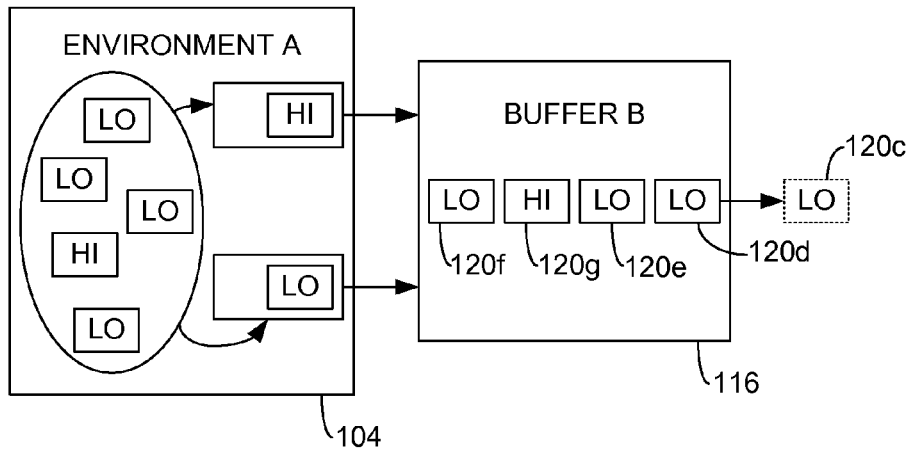
Figure 2A:
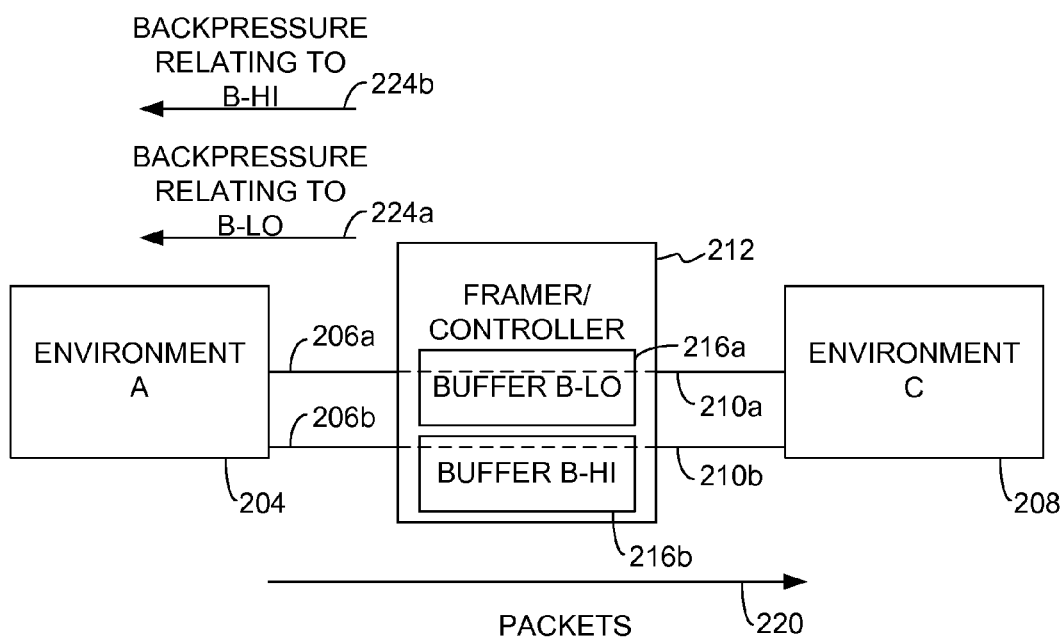
FIG. 2a is a diagrammatic representation of a network that includes two store and forward buffers that are arranged to store packets.
Figure 2B:
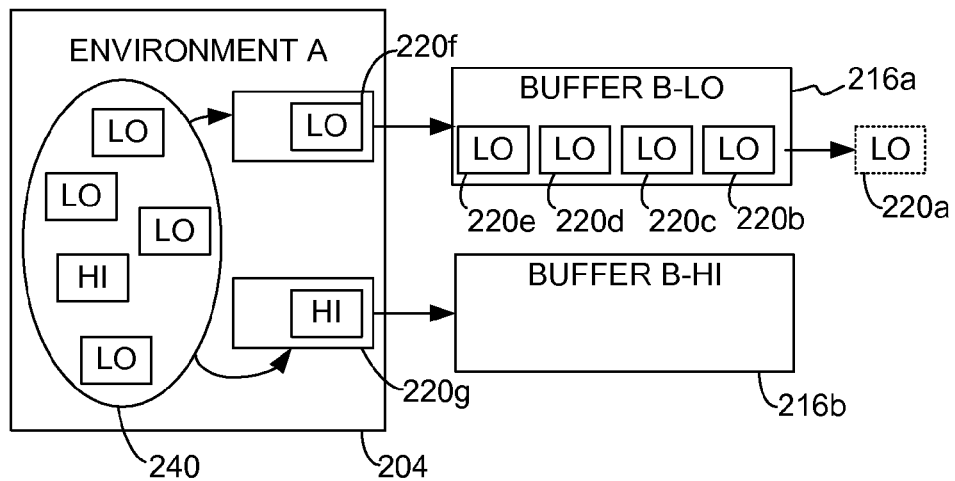
Figure 2C:
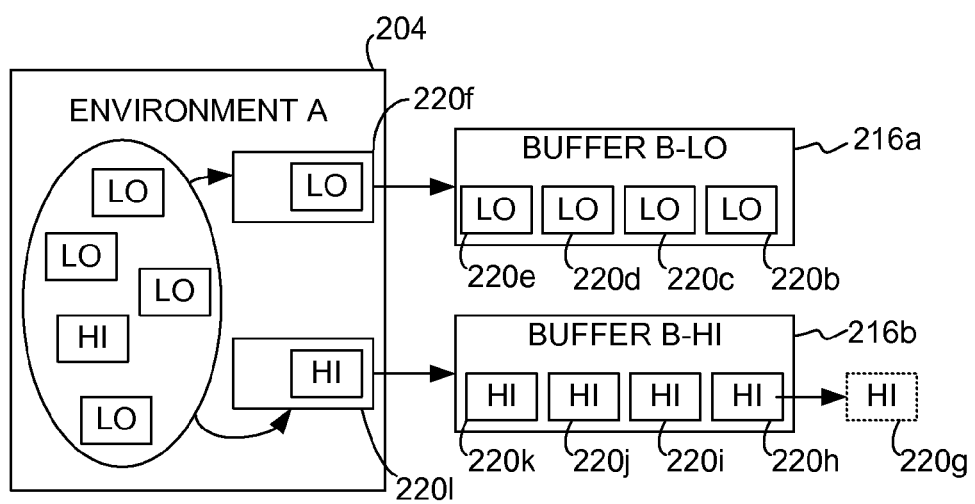

The use of at least one store and forward buffer on a framer or a controller to prevent packet underrun when packets are being sent from a network processor or a traffic management chip to a physical interface is generally effective. When a store and forward buffer is full, the framer or controller sends a per port backpressure to the network processor or the traffic management chip. In the event that a high priority packet is to be sent through the framer or controller, a full store and forward buffer will cause the transmission of the high priority packet to be delayed by the packets, which may either be high priority packets or low priority packets, held in the store and forward buffer. The delay generally increases with the size of the store and forward buffer, and also as the speed of the physical interface decreases. Such a delay is often unacceptable for high priority packets such as those associated with real time traffic. Some systems utilize dedicated store and forward buffers to reduce the delay. Although the use of one store and forward buffer to store high priority traffic and another store and forward buffer to store low priority traffic is relatively effective, the implementation costs and complexity associated with separate store and forward buffers are substantial.

By limiting the number of packets which may be stored in a store and forward buffer, the average delays associated with sending high priority packets may be reduced substantially without incurring significant overhead costs. Effectively limiting a store and forward buffer to store a single relatively large packet, or a plurality of relatively small packets when both a packet forwarding environment and a packet receiving environment are relatively fast, enables the delay associated with sending a packet from the packet forwarding environment to the store and forward buffer to be substantially equivalent to the time it takes to drain the single relatively large packet, or the plurality of relatively small packets, from the store and forward buffer. In other words, latency jitter may generally be reduced such that the average delay introduced by a store and forward buffer may be substantially minimized. The number of packets stored in a store and forward buffer may effectively be controlled by sending a backpressure to a packet forwarding environment substantially only when there is at least one full or complete packet in the store and forward buffer, and the contents of the buffer exceed a particular threshold amount.

The number of packets allowed to be stored in a store and forward buffer may be controlled by a threshold which a user may set. For example, in one embodiment, a store and forward buffer may be arranged to send or assert a backpressure when there is at least one full packet in the store and forward buffer and the number of bits stored in the store and forward buffer exceeds a certain amount, i.e., a threshold, which is typically lower than a maximum packet size. When relatively large low priority packets are being sent, a store and forward buffer of the present invention effectively functions as a large buffer that is approximately equal to the size of a packet. Hence, the maximum latency and latency jitter associated with a high priority packet of any size that is to be sent to a receiving environment from a sending environment is typically no more than the amount of time needed to transfer a single, relatively large low priority packet from a sending environment, through the store and forward buffer, to a receiving environment. Alternatively, when relatively small, low priority packets are being sent, the store and forward buffer effectively functions as a small buffer. The maximum latency and latency jitter associated with a high priority packet of any size that is to be sent to a receiving environment from a sending environment when relatively small, low priority packets are being sent is approximately equal to the time required to transfer a "threshold" number of bits or bytes to the receiving environment. As a result, latency performance associated with a single buffer system is improved, e.g., to be approximately equal to the latency performance associated with complicated multiple buffer systems.

Figure 3A:
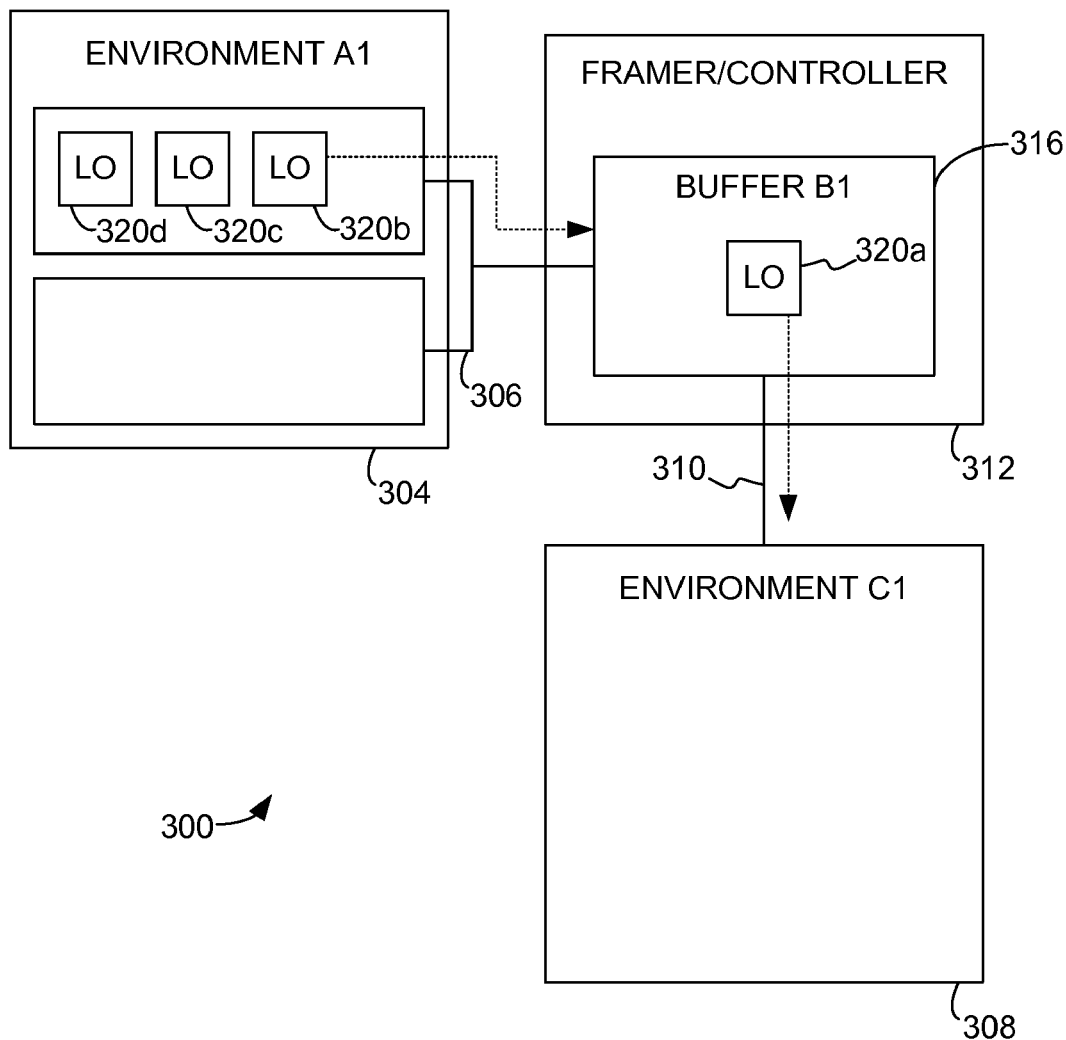
FIG. 3a is a diagrammatic representation a store and forward buffer which is arranged to contain a restricted number of full packets, e.g., approximately one relatively large packet, in accordance with an embodiment of the present invention.

With reference to FIG. 3a, a store and forward buffer which is arranged to contain a restricted number of full packets, e.g., approximately one packet, will be described in accordance with an embodiment of the present invention. A system 300 includes a first environment 304 and is in communication over a bus 306 with a framer or a controller 312 which includes a store and forward buffer 316. Bus 306 may be coupled to ports (not shown) associated with first environment 304 and framer or controller 312. Framer or controller 312, in turn, is in communication over a bus 310 with a second environment 308. In one embodiment, first environment 304 may include a network processor or a traffic management chip, while second environment 308 may include a physical interface. Physical interfaces may include, but are not limited to, a synchronous optical network (SONET) interface, a synchronous digital hierarchy (SDH) interface, an Ethernet interface, a T1 interface, and an E1 interface.

As shown, a single low priority packet 320a is held in buffer 316, e.g., because low priority packet 320a is relatively large and substantially only one low priority packet 320a may be present in buffer 316 at any given time. Hence, packets which are effectively queued for forwarding to framer or controller 316, as for example low priority packets 320b-d, may not be forwarded to framer or controller 316 until low priority packet 320a is forwarded out of buffer 316 to second environment 308.

Figure 3B:
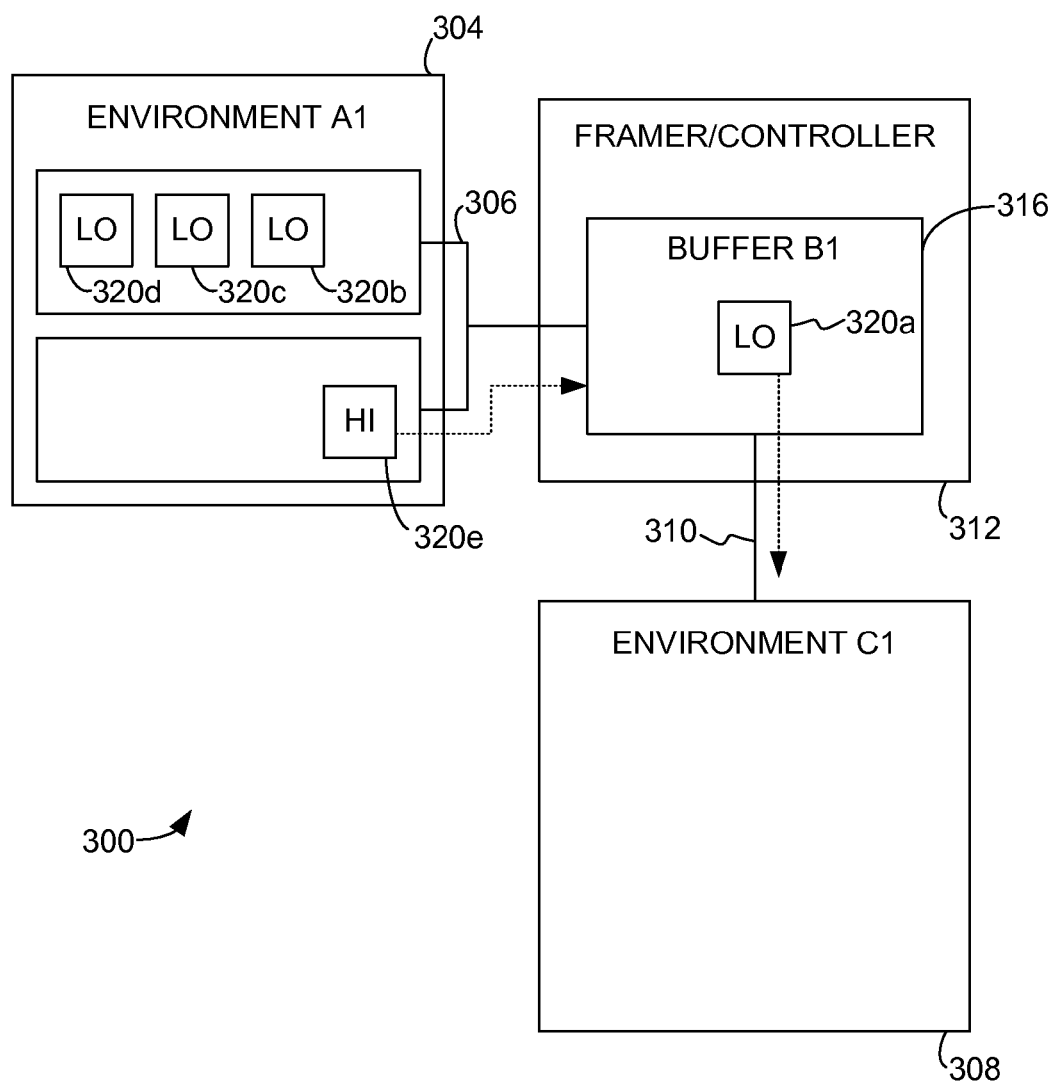
FIG. 3b is a diagrammatic representation a store and forward buffer which is arranged to contain a restricted number of full packets, e.g., a small plurality of relatively small packets, in accordance with an embodiment of the present invention.

When the number of packets stored in buffer 316 is kept relatively low, then a high priority packet which is next to be forwarded through buffer 316 may experience a delay in forwarding to the buffer which may effectively be no more than approximately the amount of time it takes to drain the buffer of low-priority packet 320a. FIG. 3b is a diagrammatic representation of a system, i.e., system 300 of FIG. 3a, within which a high priority packet is awaiting forwarding to a store and forward buffer in accordance with an embodiment of the present invention. First environment 304 is arranged to sort packets 320 by priority such that a high priority packet 320e may effectively be differentiated from low priority packets 320b-d. The ability to sort mixed-priority traffic in order to allow packets 320 to be prioritized enables high priority packets such as high priority packet 320e to effectively be processed, e.g., forwarded to second environment 308 through buffer 316, before low priority packets such as low priority packets 320b-d.

Since low priority packet 320a is the only packet in buffer 316, once low priority packet 320a is drained from buffer 316, then high priority packet 320e may be forwarded to buffer 316 through bus 306. As such, the delay associated with forwarding high priority packet 320e out of first environment 304 is approximately as long as the time it takes to drain or, in some cases, to begin to drain, low priority packet 320a from buffer 316. Hence, an average delay introduced by buffer 316 for forwarding high priority packets may effectively be reduced.

In one embodiment, a store and forward buffer of a framer or a controller may be arranged to hold more than one packet when packets are relatively small and being forwarded through the buffer at a relatively high rate. By way of example, when a forwarding environment and a receiving environment are both operating at a relatively fast rate, more than one relatively small packet may be stored in the buffer at substantially the same time. Allowing more than one relatively small packet to be stored in the buffer at any given time when both a forwarding environment and the receiving environment are operating at a relatively fast rate enables overhead time associated with starting and stopping the flow of packets into the buffer to be substantially minimized. By reducing the need for the framer or controller to send a backpressure to the forwarding environment while still enabling the number of packets held in the buffer at any given time, the delays associated with forwarding packets, especially high priority packets, may be reduced substantially without occurring significant penalties, e.g., additional overhead time to stop and start the flow of packets.

Figure 4A:
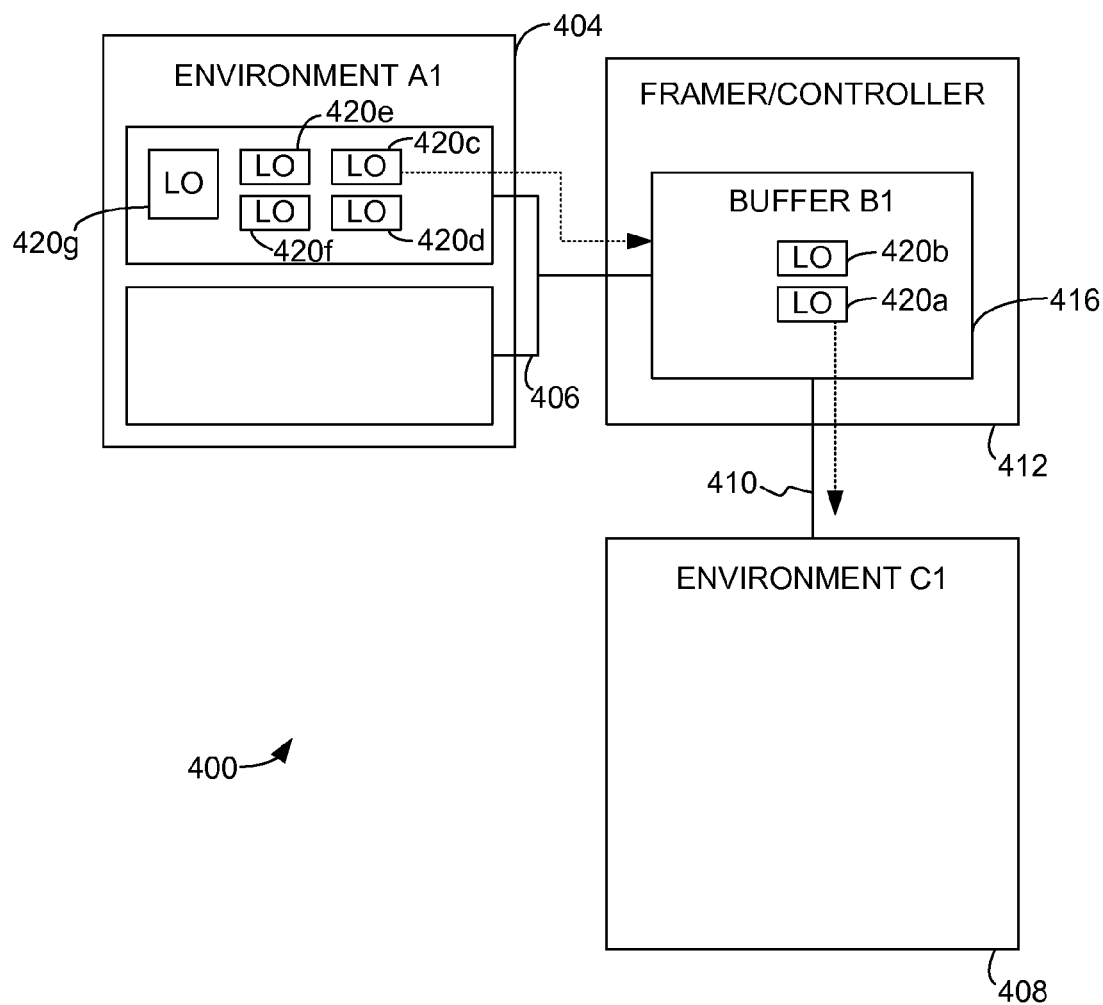
FIG. 4a is a diagrammatic representation of a system which includes a framer or a controller with a store and forward buffer that may store a plurality of relatively small packets in accordance with an embodiment of the present invention.

FIG. 4a is a diagrammatic representation of a system which includes a framer or a controller with a store and forward buffer that may store a plurality of relatively small packets in accordance with an embodiment of the present invention. A system 400 includes a first environment 404 and is in communication over a bus 406 with a framer or a controller 412. Framer or controller 412 includes a store and forward buffer 416 which is arranged to store a plurality of relatively small packets such as relatively small low priority packets 420a, 420b. Framer or controller 412 is in communication over a bus 410 with a second environment 408 which receives packets from buffer 416.

A plurality of relatively small low priority packets 420a, 420b are held in buffer 416. In the described embodiment, a plurality of relatively small low priority packets such as low priority packets 420a-f may be held in buffer 416 at one time, though a larger low priority packet such as larger low priority packet 420g would be stored as a single packet in buffer 416.

Packets which are effectively queued for forwarding to framer or controller 416, as for example smaller low priority packets 420c-f, may not be forwarded to framer or controller 416 until low priority packet 420a is forwarded out of buffer 416 to second environment 408. For instance, after low priority packet 420a is forwarded out of buffer 416 or, in some instances, after low priority packets 420a is completely forwarded out of buffer 416, relatively small low priority packets 420c may be forwarded from first environment 404 to buffer 416. As previously mentioned, by allowing more than one relatively small low priority packet 420a-f to be stored in buffer 416 at any given time, system 400 may operate more efficiently, since the overhead associated with starting and stopping the flow of packets 420 into buffer 416 in response to backpressure may be reduced.

Figure 4B:
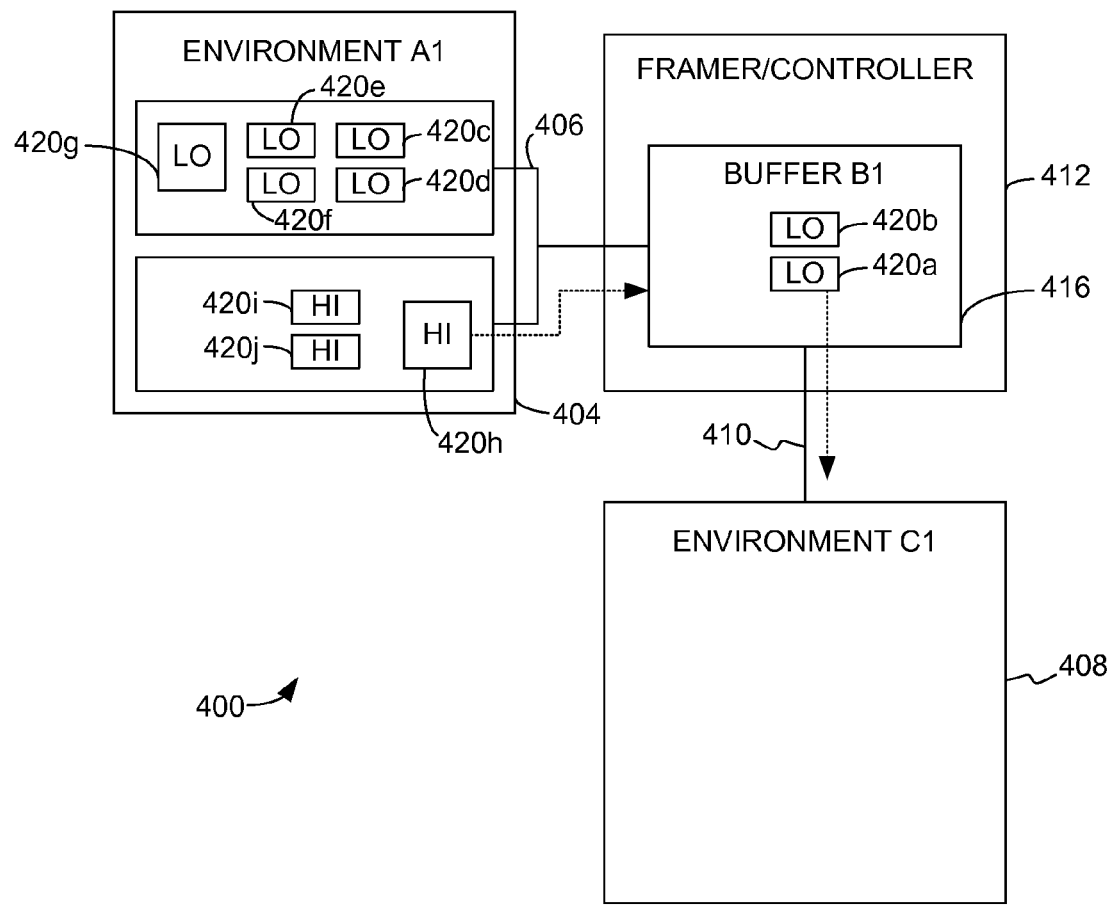
FIG. 4b is a diagrammatic representation of a system, i.e., system 400 of FIG. 4a, within which a high priority packet is awaiting forwarding to a store and forward buffer in accordance with an embodiment of the present invention.

A high priority packet which is to be forwarded through buffer 416 may experience a delay in forwarding to the buffer which may be as little as the amount of time it takes to drain the buffer of smaller low-priority packets 420a, 420b. FIG. 4b is a diagrammatic representation of a system, i.e., system 400 of FIG. 4a, within which a high priority packet is awaiting forwarding to a store and forward buffer in accordance with an embodiment of the present invention. First environment 404 sorts packets 420 so that a high priority packets 420h-j may effectively be differentiated from low priority packets 420c-g.

After low priority packets 420a, 420b are drained from buffer 416, then high priority packet 420h, which is a relatively large packet, may be forwarded to buffer 416. It should be appreciated that while a plurality of relatively small high priority packets 420i, 420j may be stored in buffer 416 at substantially the same time, only one single relatively large high priority packet such as packet 420h may be stored in buffer 416 at any given time. Hence, high priority packet 420h may not be forwarded to buffer 416 until low priority packet 420a is out of buffer 416 and low priority packet 420b is at least in the process of being forwarded out of buffer 416. Once relatively small high priority packet 420i is being forwarded out of buffer 416 and relatively small high priority packet 420j is loaded into buffer 416, then relatively small low priority packet 420c may be forwarded to buffer 416.

In a system within which a store and forward buffer of a framer or a controller is effectively configured to store very few packets, a per port back pressure may sent from the framer or controller to a packet forwarding environment when there is at least one full or complete packet in the buffer and the amount of contents in the buffer exceeds a certain level. By monitoring the amount of contents in the buffer and substantially only sending a backpressure when at least one full packet is in the buffer and the buffer is more than a certain amount full, the number of full packets allowed in the buffer may effectively be controlled. That is, monitoring the buffer to determine when at least one full packet is in the buffer and if the buffer is more than a certain amount full may enable the buffer to be controlled such that the buffer may hold one relatively large full packet at any given time, or more than one relatively small packet at any given time.

Generally, a new packet may be forwarded from a packet forwarding environment to a store and forward buffer when a packet currently stored in the store and forward buffer is forwarded to a packet receiving environment. When a plurality of relatively small packets are present in the buffer, the last of the relatively small packets must be forwarded out of the buffer before a relatively large packet may be forwarded into the buffer. Alternatively, when the buffer either contains a plurality of relatively small packets or a single relatively large packet, then at least the first relatively small packet or the single relatively large packet, as appropriate, is forwarded out of the buffer before a relatively small packet may be forwarded in.

Figure 5A:
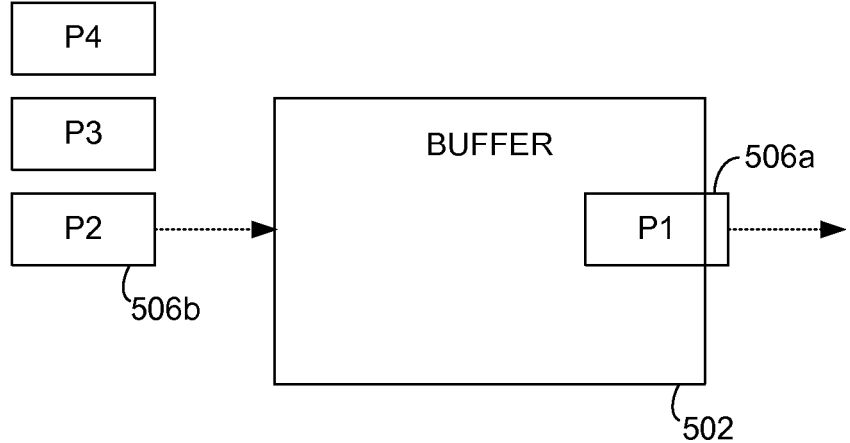
FIG. 5a is a diagrammatic representation of a process of forwarding a packet out of a buffer that involves beginning to send bits of the packet out of the buffer in accordance with an embodiment of the present invention.

"Forwarding" a packet out of a store and forward buffer, e.g., during a process of draining the buffer, may imply either beginning to send bits of the packet out of the buffer or having the entire packet out of the buffer. FIG. 5a is a diagrammatic representation of a process of forwarding a packet out of a buffer that involves beginning to send bits of the packet out of the buffer in accordance with an embodiment of the present invention. As shown a first packet 506a is partially forwarded out of a store and forward buffer 502. In other words, an overall process of providing the first packet 506 to a packet-receiving environment (not shown) has been initiated. In one embodiment, a forwarding process which forwards a packet such as packet 506b from a packet-forwarding environment (not shown) may be initiated substantially as soon as a process of forwarding packet 506a out of buffer 502 begins.

Figure 5B:
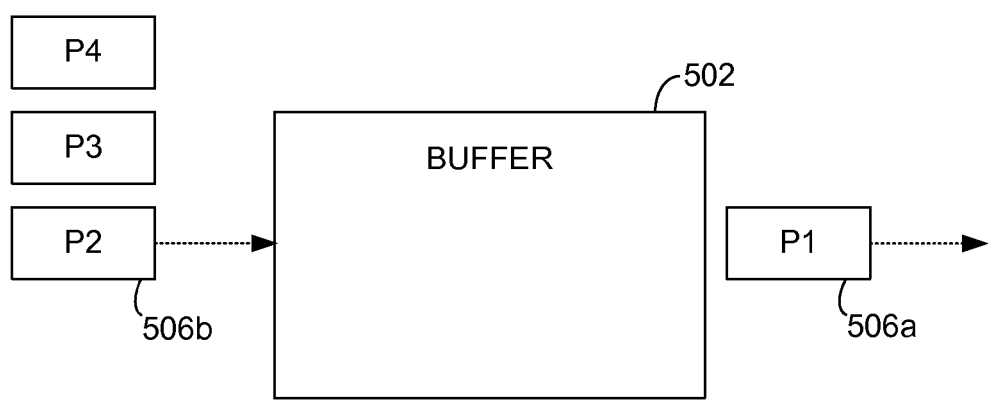
FIG. 5b is a diagrammatic representation of a process of forwarding a packet out of a buffer, e.g., buffer 502 of FIG. 5a, that involves beginning to send an entire packet out of the buffer in accordance with an embodiment of the present invention.

Alternatively, as shown in FIG. 5b, a forwarding process which forwards a packet such as packet 506b from a packet-forwarding environment (not shown) may be initiated substantially only after a process of forwarding packet 506a out of buffer 502 is effectively completed. That is, until packet 506a is effectively completely out of buffer 502, a process of forwarding packet 506b into buffer 502 may not be initiated.

Figure 6:
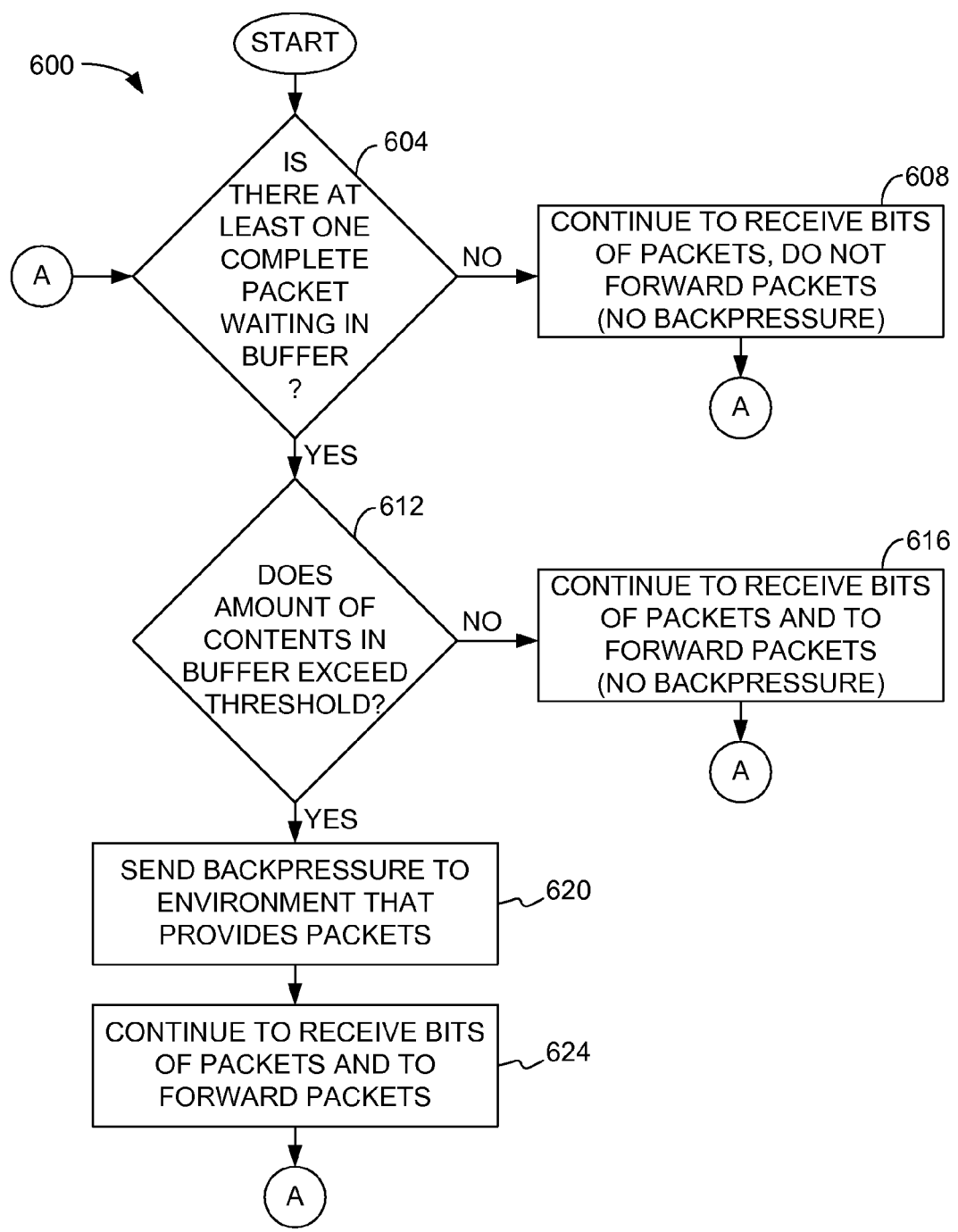
FIG. 6 is a process flow diagram which illustrates a process performed by a store and forward buffer that is associated with a framer or a controller will be described in accordance with an embodiment of the present invention.

A store and forward buffer such as buffer 502 may substantially regulate the passage of packets from a packet-forwarding environment to a packet-receiving environment. Such a store and forward buffer may include software or hardware, or a combination of both software and hardware, that enables the store and forward buffer to regulate the passage of packets therethrough. With reference to FIG. 6, steps executed by a store and forward buffer that is associated with a framer or a controller will be described in accordance with an embodiment of the present invention. A process 600 by which a buffer may substantially regulate the passage of packets from a first environment to a second environment, e.g., from a network processor or a traffic management chip of one environment to a physical interface associated with a second environment, begins at step 604 in which the buffer determines whether there is at least one complete packet waiting in the buffer. Determining whether there is at least one complete packet waiting in the buffer generally involves determining whether one or more packets are present in the buffer and are yet to be forwarded out of the buffer. It should be appreciated that the size of the buffer may generally be relatively small, as the buffer may be sized to accommodate no more than a single large packet, e.g., the buffer may be sized to accommodate one packet that is the size of a maximum transmission unit.

If it is determined that there is no complete packet waiting in the buffer, then the buffer continues to receive bits of packets from a packet provider, but does not forward the packets to a packet receiver or send backpressure in step 608. The bits of packets may be received on a port of the framer or controller. Eventually, e.g., after a predetermined period of time has elapsed or after a particular number of bits has been received in the buffer, process flow returns to step 604 in which it is once again determined whether there is at least one complete packet waiting in the buffer.

When it is determined in step 604 that there is at least one complete packet waiting in the buffer, it is determined in step 612 whether the amount of contents, i.e., bits, in the buffer exceeds a threshold which is associated with how full the buffer is. The threshold, which is generally user-controllable, is typically chosen based upon a timing rate associated with an environment which is slated to receive packets from the buffer. That is, the threshold, which is compared to the amount of contents in the buffer and is effectively used as an indication of when the buffer may be considered to be full, may be adjusted based upon the timing rates of a receiving environment. It should be appreciated that in general, the threshold may have substantially any suitable value that is typically less than a maximum packet size and effectively prevents a deadlock condition from being encounter. However, the threshold is generally of a value which enables a sending environment to re-start the transfer of bytes before a store and forward buffer drains, in order to maintain a maximum rate transfer of minimum sized packets. In one embodiment, the threshold value is determined, e.g., experimentally, based on a minimum packet size and a maximum transfer rate associated with a receiving environment.

If the determination in step 612 is that the amount of contents in the buffer does not exceed the threshold, then the buffer continues to receive packets and to forward packets, without sending backpressure, as appropriate in step 616. From step 616, process flow eventually returns to step 604 in which it is determined whether there is at least one complete packet waiting in the buffer. Alternatively, if it is determined in step 612 that the amount of contents in the buffer does exceed the threshold, the indication is that the rate at which bits are being forwarded out of the buffer is insufficient for the rate at which bits are being provided to the buffer. Accordingly, a backpressure, as for example a per port backpressure, is sent from the buffer to the packet provider, which may be a network processor or a traffic management chip, in step 620. Once a backpressure is sent to the packet provider, the buffer continues to receive bits of packets and to forward packets in step 624. At some point, process flow returns to step 604 in which it is determined if there is at least one complete packet waiting in the buffer.

Figure 7:
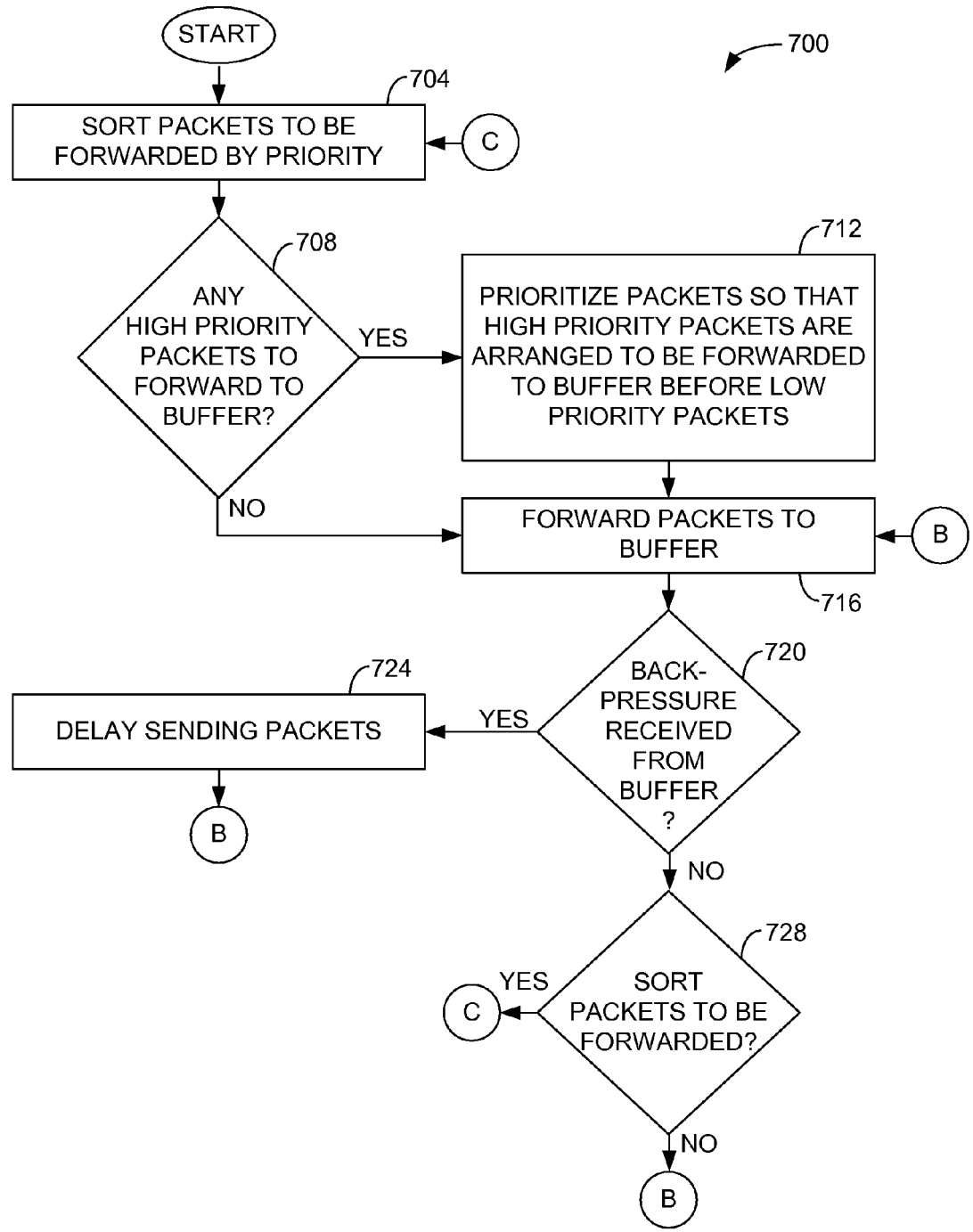
FIG. 7 is a process flow diagram which illustrates the steps undertaken by a packet provider in accordance with an embodiment of the present invention.

In general, a packet provider which provides packets to a buffer that is often a component of a framer or a controller sorts packets by priority, then attempts to send any higher priority packets to the buffer before sending lower priority packets. FIG. 7 is a process flow diagram which illustrates the steps undertaken by a packet provider in accordance with an embodiment of the present invention. In the described embodiment, a packet provider generally forwards packets to the buffer such that there is often only one packet held in the buffer at any given time. It should be appreciated that in some instances, e.g., when relatively small packets are to be forwarded out of the packet provider at a relatively high rate, the buffer may contain a plurality of packets. However, even when a plurality of relatively small packets may effectively be stored in the buffer at substantially the same time, the buffer is generally not completely full, since the threshold described above may be set at a level which effectively prevents the buffer from being completely filled up. Hence, the packet provider may essentially implement a packet transmission delay that varies the time between when one packet is forwarded and a subsequent packet is forwarded to prevent the buffer from being completely filled up, i.e., in response to a backpressure received from the buffer.

A process 700 of processing packets which are to be forwarded from one environment to another through a buffer associated with a framer or a controller begins at step 704 in which packets which are to be forwarded through the buffer are sorted based on priority. The packets may be sorted using substantially any suitable method which enables higher priority packets to be identified and effectively differentiated from lower priority packets. Once the packets are sorted by priority, it is determined in step 708 whether any of the packets are high priority packets. That is, a determination is made regarding whether there are any high priority packets to forward to the buffer.

If the determination in step 708 is that there are no high priority packets to forward to the buffer, the indication is that the packets to be forwarded all have relatively low priorities. Hence, in step 716, such packets are forwarded to the buffer. While all packets may be queued for transmission to the buffer in a shared queue, in one embodiment, such packets may be placed in a "low priority packet" queue, i.e., a "low priority packet queue of the packet provider environment which is feeding the buffer, and provided to the buffer from the queue.

A determination is made in step 720 as to whether a backpressure, e.g., a per port backpressure, has been received from the buffer. In other words, it is determined whether the rate at which packets are forwarded to the buffer in step 716 should be altered. If it is determined in step 720 that a backpressure has been received from the buffer, then the sending of packets may be delayed in step 724. Delaying packets may entail sending an entire packet, then waiting a certain amount of time before sending a subsequent packet. From step 724, process flow returns to step 716 in which packets are forwarded to the buffer, with delays as appropriate.

Alternatively, if it is determined in step 720 that no backpressure has been received from the buffer, process flow moves from step 720 to step 728 in which it is determined whether packets to be forwarded should be sorted. If it is determined that packets to be forwarded are not to be sorted, packets continue to be forwarded to the buffer in step 716. On the other hand, if it is determined that packets to be forwarded are to be sorted, then process flow returns to step 704 in which packets to be forwarded are sorted by priority. It should be appreciated that in some instances, packets which are to be forwarded to the buffer may be substantially continuously sorted by priority.

Returning to step 708, if it is determined that there are high priority packets to forward to the buffer, then packets are prioritized in step 712 such that the high priority packets may be forwarded to the buffer before any lower priority packets. By way of example, when the packet provider environment which is sending packets to the buffer uses a "high priority" queue and a "low priority" queue, the high priority packets may be queued in the "high priority" queue, and packets may be forwarded to the buffer from the "high priority" queue prior to packets from the "low priority" queue. Alternatively, when the packet provider environment uses a shared queue, high priority packets may be arranged in the queue such that the high priority packets are sent to the buffer before lower priority packets.

Once the packets are prioritized in step 712, the packets may be forwarded to the buffer. As discussed above, packets may be forwarded such that high priority packets are forwarded first. Lower priority packets may be forwarded when substantially all available high priority packets have already been forwarded.

Figure 8:
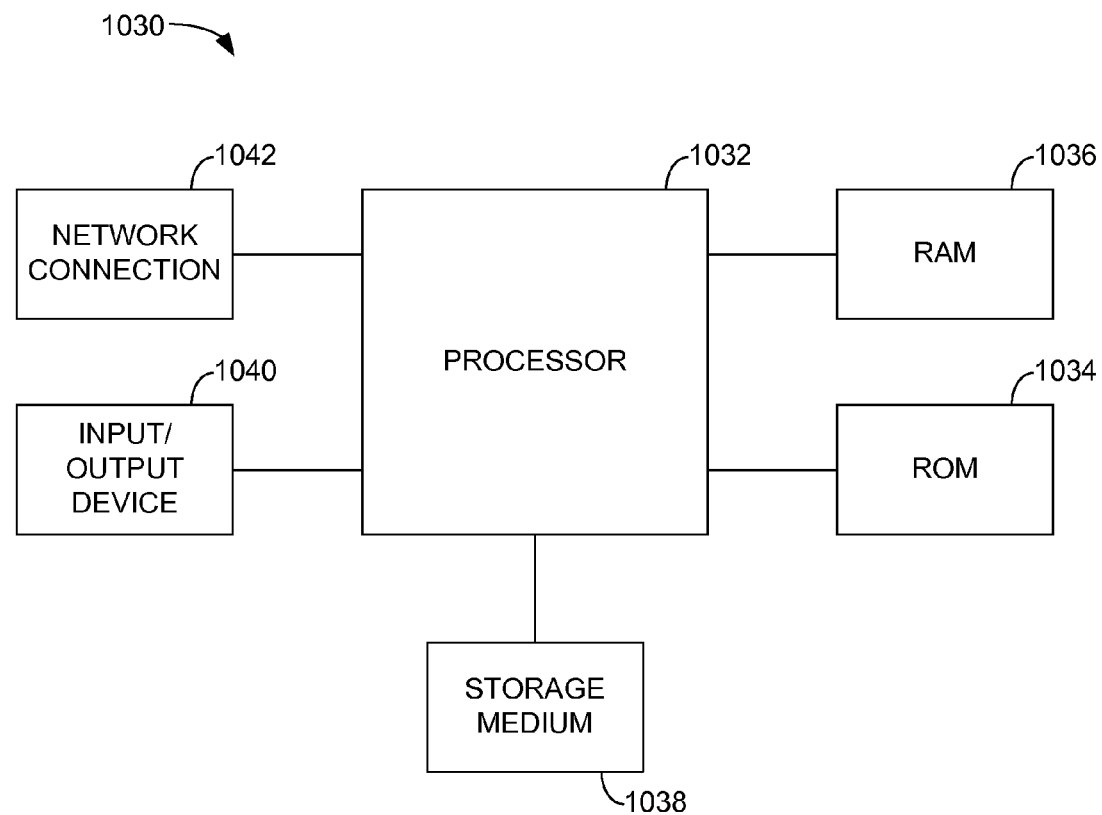
FIG. 8 illustrates a typical, general purpose computing device or computer system suitable for implementing the present invention.

FIG. 8 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the size of a store and forward buffer may vary widely. In one embodiment, a store and forward buffer may be arranged to be at least one or two times the size of a maximum transmission unit. In another embodiment, since the store and forward buffer is generally arranged to hold relatively few packets at any given time such that delays associated with sending relatively high priority packets may be reduced, the store and forward buffer may be approximately the size of a maximum transmission unit.

The relative transmission rates or speeds associated with sending and receiving environments may vary widely. It should be appreciated that a store and forward buffer is generally arranged to accommodate sending and receiving environments with different speeds. In other words, a store and forward buffer may be used in systems within which sending environments have higher speeds than receiving environments, sending environments have lower speeds than receiving environments, or sending environments have approximately the same speeds as receiving environments.

In one embodiment, a sending environment will generally stop sending bytes upon receipt of a backpressure signal. In the event that a packet transfer from the sending environment to a store and forward buffer is in progress, the transfer progress will be stalled even through an incomplete packet has been sent. However, backpressure schemes may be implemented in substantially any suitable manner including, but not limited to, allowing a packet transfer progress to be completed before complying with a received backpressure request.

Methods of indicating a backpressure state from a store and forward buffer to a sending environment may be implemented in a variety of different ways. By way of example, backpressure may be signaled through the use of a dedicated wire with a substantially constant indication of a current backpressure status. Backpressure may also be indicated by an in-band message of a packet carrying buss with separate messages to indicate the start and stop of backpressure.

A framer or a controller has been described as sending a per port back pressure to a packet forwarding environment when a store and forward buffer contains a full packet and has an amount of contents that exceeds a threshold. The use of a check for at least one full packet in addition to a threshold check may generally be applied to substantially any store and forward buffer arrangement. For example, when a framer or a controller contains both a store and forward buffer for low priority packets and a store and forward buffer for high priority packets, both store and forward buffers may utilize a check for at least one full packet and a threshold check to determine when to send a backpressure.

In lieu of an overall system which enables either one larger packet or a plurality of smaller packets to be held in a buffer, an overall system may instead effectively require that only a single packet of any size may be held in a buffer at any given time. For instance, in addition to using a threshold associated with how full a buffer is and checking whether at least one full packet is present in a buffer, other information may be utilized to effectively prevent more than one packet from being present in the buffer at any given time.

The threshold which indicates how full a buffer is may generally be a variable threshold. That is, the threshold may be varied by a system administrator in response to traffic conditions as appropriate. For example, when packets are provided to the buffer at a rate which has not required a backpressure to be sent for a given length of time, then the threshold may be adjusted to enable more contents to be stored in the buffer before a backpressure is sent.

The present invention has been described as being suitable for use in a system which supports mixed-priority traffic, e.g., traffic which includes both lower priority packets and higher priority packets. It should be appreciated, however, that the use of a store and forward buffer which may be arranged to store approximately one single relatively large packet and a low plurality of relatively small packets may be suitable for use in systems which support either only lower priority packets or higher priority packets.

In general, steps associated with the various methods of the present invention may be altered, reordered, added, and removed without departing from the spirit or the scope of the present invention. By way of example, as mentioned above, a packet provider environment may substantially continuously sort packets which are to be forwarded such that high priority packets may be readily identified. Further, although a determination of whether to send a backpressure from a framer or a controller has been described as including determining whether the amount of contents in a buffer exceeds a threshold when there is at least one complete packet waiting in the buffer, the determination of whether to send a backpressure may instead included determining whether there is at least one complete packet waiting in the buffer if it is determined that the amount of contents of the buffer exceed a threshold. Therefore, the present examples are to be considered as illustrative and not restrictive, and the invention is not to be limited to the details given herein, but may be modified within the scope of the appended claims.

What is claimed is:

1. A method comprising:
setting a threshold number of bits for a store and forward buffer in a first device, wherein the threshold is lower than the number of bits in a maximum transmission unit (MTU);
receiving at the first device packets from a second device in a sending environment that is configured to start and stop packet transfer based on backpressure signals;
storing the packets in the store and forward buffer for transmission to a receiving environment, wherein a first transfer speed to the receiving environment is lower than a second transfer speed from the sending environment and a buffer level in the store and forward buffer reflects a difference between the first and second transfer speeds;
sending the packets to the receiving environment;
determining when contents of the store and forward buffer meet criteria including when the buffer level exceeds the threshold and at least one complete packet is in the store and forward buffer; and
sending a stop transfer backpressure signal to the second device when it is determined that the buffer level exceeds the threshold and at least one complete packet is in the store and forward buffer.

2. The method of claim 1, wherein the setting comprises setting the threshold to enable storage of a few relatively small packets or one relatively large packet in order to reduce delay when sending packets from the sending environment to the receiving environment, wherein the relatively small packets are small relative to the MTU and the one relatively large packet approximates a size of the MTU.

3. The method of claim 1, wherein setting comprises setting the threshold to enable storage of a few relatively small packets or one relatively large packet in order to reduce latency jitter when sending packets from the sending environment to the receiving environment.

4. The method of claim 1, wherein setting comprises setting the threshold to enable storage of two or more complete packets in order to reduce a number of backpressure signals.

5. The method of claim 1, wherein the setting comprises setting the threshold based on a minimum packet size and the transfer speed to the receiving environment.

6. The method of claim 1, wherein the sending comprises sending high priority packets before sending low priority packets in order to reduce delay when sending high priority packets from the sending environment to the receiving environment.

7. The method of claim 1, wherein when the buffer level drops below the threshold further comprising sending a start transfer backpressure signal to the second device.

8. The method of claim 1, wherein when a first bit of the last complete packet in the store and forward buffer is sent to the receiving environment, further comprising sending a start transfer backpressure signal to the second device.

9. An apparatus comprising:
a first interface coupled to a sending environment configured to receive packets and send backpressure signals;
a second interface coupled to a receiving environment configured to send the packets;
a memory comprising a store and forward buffer configured to store the packets for transmission, wherein a first transfer speed for receiving the packets at the first interface is higher than a second transfer speed for sending packets over the second interface and a buffer level in the store and forward buffer reflects a difference between the first and second transfer speeds;
a processor configured to:
set a threshold number of bits for the store and forward buffer, wherein the threshold is lower than the number of bits in a maximum transmission unit (MTU);
determine when the buffer level in the store and forward buffer exceeds the threshold and at least one complete packet is in the buffer; and
send a stop transfer backpressure signal to the sending environment over the first interface when it is determined that the buffer level exceeds the threshold and at least one complete packet is in the buffer.

10. The apparatus of claim 9, wherein the processor is configured to set the threshold to enable storage of a few relatively small packets or one relatively large packet in order to reduce delay when sending packets from the sending environment to the receiving environment, and wherein the relatively small packets are small relative to an MTU and the one relatively large packet approximates a size of the MTU.

11. The apparatus of claim 9, wherein the processor is configured to set the threshold to enable storage of a few relatively small packets or one relatively large packet in order to reduce latency jitter when sending packets from the sending environment to the receiving environment.

12. The apparatus of claim 9, wherein the processor is configured to set the threshold to enable storage of two or more complete packets in order to reduce a number of backpressure signals.

13. The apparatus of claim 9, wherein the processor is configured to set the threshold based on a minimum packet size and the transfer speed to the receiving environment.

14. The apparatus of claim 9, wherein the processor is configured to, when the buffer level drops below the threshold, send a start transfer backpressure signal to the second device.

15. The apparatus of claim 9, wherein the processor is configured to, when a first bit of the last complete packet in the store and forward buffer is sent to the receiving environment, send a start transfer backpressure signal to the second device.

16. A method comprising:
at a first device, communicating with a store and forward buffer in a second device in order to send packets and receive backpressure signals, wherein the store and forward buffer is configured to store packets for transmission to a receiving environment;
sending packets to the second device from the first device, wherein a first transfer speed to the second device is higher than a second transfer speed to the receiving environment and a buffer level in the store and forward buffer reflects a difference between the first and second transfer speeds;
at the first device, receiving a stop transfer backpressure signal from the second device, wherein the stop transfer backpressure signal indicates that the buffer level exceeds a first threshold number of bits and at least one full packet is in the store and forward buffer, and wherein the threshold is lower than the number of bits in a maximum transmission unit (MTU); and
stopping transmission of packets based on the stop transfer backpressure signal.

17. The method of claim 16, further comprising:
at the first device, receiving a start transfer backpressure signal from the second device, wherein the start transfer backpressure signal indicates that the buffer level is below a second threshold number of bits and/or no full packets are in the store and forward buffer; and resuming transmission of packets based on the start transfer backpressure signal.

18. The method of claim 16, further comprising at the first device, sorting packets based on priority, wherein the sending packets comprises sending higher priority packets before sending lower priority packets.

19. The method of claim 16, wherein the stopping comprises at least one of stopping transmission of packets immediately upon receipt of the stop transfer backpressure signal and stopping transmission of packets after a complete packet has been sent.

20. A system comprising:
a first device comprising:
  a network processor configured to send a plurality of packets over a bus and receive backpressure signals, wherein the bus comprises a plurality of ports, each port being associated with individual ones of a plurality of buffers;
  a memory comprising the plurality of buffers, wherein individual ones of the plurality of buffers contain packets having a similar priority;
a second device comprising:
  a first interface coupled to the bus configured to receive the plurality of packets and send backpressure signals to individual ones of the plurality of ports;
  a second interface coupled to a receiving environment configured to send the plurality of packets;
  a memory comprising a store and forward buffer configured to store the plurality of packets for transmission, wherein a first transfer speed for receiving the packets at the first interface is higher than a second transfer speed for sending packets over the second interface and a buffer level in the store and forward buffer reflects a difference between the first and second transfer speeds;
  a processor configured to:
    set a threshold number of bits for the store and forward buffer wherein the threshold is lower than the number of bits in a maximum transmission unit (MTU);
    determine when the buffer level in the store and forward buffer exceeds the threshold and at least one complete packet is in the buffer; and
    send stop transfer backpressure signals on a per port basis to one or more ports of the bus over the first interface when it is determined that the buffer level exceeds the threshold and at least one complete packet is in the buffer.

21. The system of claim 20, wherein the network processor is configured to stop sending packets via individual ports in response to the per port stop transfer backpressure signals and start sending packets via individual ports in response to per port start transfer backpressure signals.

22. The system of claim 21, wherein the network processor is configured to stop sending packets via individual ports immediately upon receipt of the stop transfer backpressure signal or stops transmission of packets after a complete packet has been sent.

23. The system of claim 20, wherein the processor is configured to set the threshold to enable storage of a few relatively small packets or one relatively large packet in order to reduce delay when sending packets from the first device to the receiving environment, and wherein the relatively small packets are small relative to the MTU and the one relatively large packet approximates a size of the MTU.

24. The system of claim 20, wherein the processor is configured to set the threshold to enable storage of a few relatively small packets or one relatively large packet in order to reduce latency jitter when sending packets from the first device to the receiving environment.

25. The system of claim 20, wherein the processor is configured to set the threshold to enable storage of two or more complete packets in order to reduce a number of backpressure signals.

26. The system of claim 20, wherein the processor is configured to set the threshold based on a minimum packet size and the transfer speed to the receiving environment.

27. The system of claim 20, wherein the processor is configured to, when the buffer level drops below the threshold, send start transfer backpressure signals on a per port basis to the first device, wherein the start transfer backpressure signals are sent to ports associated with the highest priority packets before being sent to ports associated with lower priority packets.

28. The system of claim 20, wherein the processor is configured to, when a first bit of the last complete packet in the store and forward buffer is sent to the receiving environment, send a start transfer backpressure signal to the first device.

* * * * *